United States Patent
Guo et al.

(10) Patent No.: US 9,701,864 B2
(45) Date of Patent: Jul. 11, 2017

(54) EPOXY RESINS FOR WATERBORNE DISPERSIONS

(71) Applicant: DOW GLOBAL TECHNOLOGIES LLC, Midland, MI (US)

(72) Inventors: Yinzhong Guo, Pearland, TX (US); Susan Machelski, Midland, MI (US); Christian Piechocki, Marienthal (FR)

(73) Assignee: Dow Global Technologies LLC, Midland, MI (US)

( * ) Notice: Subject to any disclaimer, the term of this patent is extended or adjusted under 35 U.S.C. 154(b) by 155 days.

(21) Appl. No.: 14/403,741

(22) PCT Filed: May 29, 2013

(86) PCT No.: PCT/US2013/043032
§ 371 (c)(1),
(2) Date: Nov. 25, 2014

(87) PCT Pub. No.: WO2013/181210
PCT Pub. Date: Dec. 5, 2013

(65) Prior Publication Data
US 2015/0119499 A1   Apr. 30, 2015

Related U.S. Application Data

(60) Provisional application No. 61/653,609, filed on May 31, 2012.

(51) Int. Cl.
| | |
|---|---|
| *C09D 163/00* | (2006.01) |
| *C09D 163/02* | (2006.01) |
| *C08L 63/00* | (2006.01) |
| *C08L 67/02* | (2006.01) |
| *C08G 59/16* | (2006.01) |
| *C08G 59/18* | (2006.01) |
| *C08G 59/22* | (2006.01) |
| *C08G 59/42* | (2006.01) |
| *C09D 5/02* | (2006.01) |

(52) U.S. Cl.
CPC ......... *C09D 163/00* (2013.01); *C08G 59/186* (2013.01); *C08G 59/226* (2013.01); *C08G 59/4246* (2013.01); *C09D 5/02* (2013.01); *C08L 67/02* (2013.01)

(58) Field of Classification Search
CPC .. C08G 59/186; C08G 59/4246; C08G 63/52; C08G 63/676; C08L 63/00–63/10; C08L 67/02; C09D 163/00–163/10; C09D 167/02; C09J 163/00–163/10
See application file for complete search history.

(56) References Cited

U.S. PATENT DOCUMENTS

| | | | | |
|---|---|---|---|---|
| 2,585,323 | A * | 2/1952 | Elwell | C08G 63/127 528/274 |
| 2,880,230 | A * | 3/1959 | Edwards | C08G 73/1007 156/331.9 |
| 4,285,897 | A * | 8/1981 | Zakaria | B05D 7/02 152/450 |
| 4,608,406 | A | 8/1986 | Williams, Jr. et al. | |
| 5,118,729 | A | 6/1992 | Piechocki | |
| 5,252,637 | A | 10/1993 | Craun et al. | |
| 5,424,340 | A | 6/1995 | Pfeil et al. | |
| 5,527,839 | A | 6/1996 | Walker | |
| 6,143,809 | A | 11/2000 | Elmore et al. | |
| 6,221,934 | B1 | 4/2001 | Stark et al. | |
| 6,277,928 | B1 | 8/2001 | Stark et al. | |
| 6,294,596 | B1 * | 9/2001 | Papalos | C08G 59/066 523/404 |
| 7,399,348 | B2 | 7/2008 | Blanda et al. | |
| 2002/0111422 | A1 | 8/2002 | Back et al. | |
| 2005/0287302 | A1 | 12/2005 | Awad et al. | |
| 2009/0054621 | A1 * | 2/2009 | Verral | A61K 47/48215 528/408 |
| 2013/0090413 | A1 * | 4/2013 | Kawahara | C08G 59/186 523/426 |

FOREIGN PATENT DOCUMENTS

| | | |
|---|---|---|
| CA | 1291290 C | 10/1991 |
| EP | 491550 A2 | 6/1992 |
| JP | 07206982 A | 8/1995 |
| JP | 07309954 A | 11/1995 |
| JP | WO 2012043320 A1 * 4/2012 | ........... C08G 59/186 |
| WO | 0020499 A1 | 4/2000 |

OTHER PUBLICATIONS

Scifinder properties of CAS 89-32-7 (2016).*
Dow Chemical, Dow Liquid Epoxy Resins (1999).*

* cited by examiner

*Primary Examiner* — Kregg Brooks
(74) *Attorney, Agent, or Firm* — Karl E. Stauss; Cantor Colburn LLP

(57) ABSTRACT

The present invention relates to compounds comprising the epoxide functional reaction product of: (a) at least one molecule comprising two terminal epoxy-reactive moieties; with (b) two molecules comprising two epoxide moieties; wherein, said compound comprises, pendent to the residue of (a) (i.e. as a side chain of the molecule), one or more polyoxyalkylene or polyoxyalkylene alkyl ether radical(s) having a weight average molecular weight of at least 400. Also provided are aqueous coating compositions comprising such compounds.

10 Claims, No Drawings

EPOXY RESINS FOR WATERBORNE DISPERSIONS

The present invention relates to epoxy resins. More specifically, the present invention relates to epoxy resins which may be used to prepare waterborne epoxy resin dispersions that are suitable for a variety of applications, for example compositions for providing, when cured, a coating layer on a substrate surface. Also provided are aqueous coating compositions comprising such epoxy resins, either as the sole epoxy component (i.e. a self-dispersible epoxy resin dispersion) or in combination with a further epoxy resin which is not, in itself, water dispersible.

Coating compositions comprising curable epoxy resins are used to treat surfaces thereby providing, when cured, protection against damage resulting from everyday use and/or exposure to the environment. Such coating compositions may typically be divided into two distinct classes, solventborne epoxy coating compositions and waterborne epoxy coating compositions.

Solventborne epoxy coating compositions contain organic solvents which facilitate dispersion or solubilisation of the epoxy component(s) and may also act to reduce the viscosity of the composition, thereby facilitating application. However, organic solvents represent a major environmental hazard as they can volatilize at room temperature and pressure, thereby releasing volatile organic compounds (VOCs) into the atmosphere. The fire and explosion risks associated with VOCs, coupled with an increasing need to reduce air pollution hazards caused by volatilization of organic solvents has created an increased desire to replace solventborne coating compositions with more environmentally friendly waterborne epoxy coating compositions.

Waterborne epoxy coating compositions, i.e. compositions in which the resin is predominantly dispersed in water are known. For example, U.S. Pat. No. 5,118,729 discloses epoxy resin amphiphiles and stable aqueous epoxy resin dispersions thereof, wherein said amphiphiles comprise, at one end, a hydrophobic epoxy moiety and, at the other end, a hydrophilic, high molecular weight polyoxyethylene moiety which are linked via a difunctional linking group such as a dicarboxylic acid or an anhydride thereof. The hydrophilic moiety is a residue of a monoether of a polyethylene glycol. The disclosed amphiphiles are suitable for dispersing in water epoxy resins which are not in themselves readily dispersible in water. However, although the resultant dispersions are believed to be stable, formation of such dispersions tends to result in significant levels of foaming which is preferably dissipated or removed prior to use as a coating composition. Further, it is believed that, as such amphiphiles have a relatively high melt viscosity, the dispersing efficiency of such compounds is reduced in comparison to the use of organic solvents in solventborne epoxy coating compositions.

It is therefore an object of the present invention to provide an alternative epoxy resin which can be used to prepare stable waterborne epoxy resin compositions with a reduced tendency to foam. Further, in preferred embodiments, the epoxy resins will have a reduced melt viscosity in comparison with known epoxy amphiphiles, as such epoxy resins are believed to have an improved dispersing efficiency. Furthermore, in the most preferred embodiments, the epoxy resins will have a reduced melt viscosity in comparison with known epoxy amphiphiles and may be used to prepare stable waterborne epoxy resin compositions with a reduced tendency to foam.

Statement of the Invention

According to a first aspect, the present invention provides compounds comprising an epoxide functional reaction product of:
(a) at least one molecule comprising two terminal epoxy-reactive moieties; with
(b) at least two molecules comprising two epoxide moieties;
wherein, said compound comprises, pendent to the residue of (a) (i.e. as a side chain of the molecule), one or more polyoxyalkylene or polyoxyalkylene alkyl ether radical(s) having a weight average molecular weight of at least 400.

Preferably, the compound is according to Formula (I) or Formula (II):

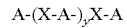   Formula (I)

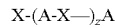   Formula (II)

wherein each A independently represents (i) an epoxy terminated monovalent radical formed from one or more diglycidyl ether compounds comprising a cycloaliphatic and/or an aromatic hydrocarbylene moiety or (ii) a divalent radical formed by opening of the terminal epoxy of (i);

each X independently represents (i) a mono or divalent radical of a polyester, wherein said polyester is formed via esterification of one or more polycarboxylic acids, anhydrides or mixtures thereof with one or more polyols, polyalkanolamines, or mixtures thereof, or (ii) a monovalent or divalent radical of a polycarboxylic acid, wherein said polycarboxylic acid is formed via esterification of a tetracarboxylic acid, dianhydride or mixtures thereof with one or more polyols, polyalkanolamines, or mixtures thereof;

y represents an integer from 0 to 10; and z represents an integer from 1 to 10;

wherein, when X is said polyester, the polyol and/or polyalkanolamine is/are substituted with one or more pendent polyoxyalkylene or polyoxyalkylene alkyl ether radicals, or when X is said polycarboxylic acid, the polyol and/or polyalkanolamine include one or more pendent polyoxyalkylene or polyoxyalkylene alkyl ether radicals; said polyoxyalkylene or polyoxyalkylene alkyl ether having a weight average molecular weight of at least 400.

According to a second aspect, the present invention provides aqueous coating compositions comprising one or more compounds according to the first aspect of the present invention.

Throughout the specification, any reference to "waterborne" or "aqueous" dispersions refers to dispersions in which the resin is dispersed in water or an aqueous medium. Although it is envisaged that such dispersions may contain low levels, i.e. less than 10 weight percent, preferably less than 1 weight percent of volatile organic solvents, it is preferred that such dispersions are free of any such organic solvents.

Throughout the specification, any reference to "stable" dispersions refers to any system in which the dispersed phase is maintained within the continuous medium, e.g. water, and does not agglomerate to a significant extent within a period of 45 minutes at room temperature and pressure. Significant agglomeration can be observed as a visual separation of the continuous and discontinuous phase. The dispersed phase may be in the form of a liquid or a solid.

It has been surprisingly discovered that stable waterborne epoxy resin compositions with a reduced tendency to foam may be prepared by using the novel compounds of the present invention, either as the sole epoxy resin component (i.e. a self dispersing waterborne epoxy resin dispersion) or as an dispersing aid for a secondary epoxy resin component which is not in itself dispersible in water.

The novel compounds of the present invention comprise an epoxide functional reaction product of:
- (a) at least one molecule comprising two terminal epoxy-reactive moieties; with
- (b) two molecules comprising two epoxide moieties;

wherein, said compound comprises, pendent to the residue of (a), one or more polyoxyalkylene or polyoxyalkylene alkyl ether radical(s) having a weight average molecular weight of at least 400.

Preferably, the compounds of the present invention are formed by attachment of one or more hydrophilic moieties comprising one or more pendent polyoxyalkylene or polyoxyalkylene alkyl ether radicals to one or more hydrophobic epoxy moieties via an ester linkage. Specifically, the present invention preferably relates to compounds according to Formula (I) or Formula (II):

A-(X-A-)$_y$X-A      Formula (I)

X-(A-X—)$_z$A      Formula (II)

wherein:
each A independently represents:
- (i) an epoxy terminated monovalent radical formed from one or more diglycidyl ether compounds comprising a cycloaliphatic and/or an aromatic hydrocarbylene moiety; or
- (ii) a divalent radical formed by opening of the terminal epoxy of (i);

each X independently represents:
- (i) a mono or divalent radical of a polyester, wherein said polyester is formed via esterification of one or more polycarboxylic acids, anhydrides or mixtures thereof with one or more polyols, polyalkanolamines, or mixtures thereof; or
- (ii) a monovalent or divalent radical of a polycarboxylic acid, wherein said polycarboxylic acid is formed via esterification of a tetracarboxylic acid, dianhydride or mixtures thereof with one or more polyols, polyalkanolamines, or mixtures thereof;

y represents 0 or an integer from 1 to 10, preferably 0 or an integer from 1 to 5, more preferably 0; and
z represents an integer from 1 to 10, preferably an integer from 1 to 5, more preferably 1;
wherein, when X is said polyester, the polyol and/or polyalkanolamine is/are substituted with one or more pendent polyoxyalkylene or polyoxyalkylene alkyl ether radicals, or when X is said polycarboxylic acid, the polyol and/or polyalkanolamine include one or more pendent polyoxyalkylene or polyoxyalkylene alkyl ether radical; said polyoxyalkylene or polyoxyalkylene alkyl ether having a weight average molecular weight of at least 400.

Preferably, the compounds of the present invention are those according to Formula (I) above.

The compounds of the present invention comprise one or more pendent polyoxyalkylene or polyoxyalkylene alkyl ether radicals having a weight average molecular weight ($M_w$), measured by gel permeation chromatography (GPC), of at least 400. Preferably, said polyoxyalkylene or polyoxyalkylene alkyl ether radicals have a $M_w$ of at least 500, more preferably a $M_w$ from 500 to 4000, and even more preferably a $M_w$ from 550 to 2000. Such compounds are preferred as it is believed that by restricting the molecular weight of the pendent polyoxyalkylene or polyoxyalkylene alkyl ether radicals, it is possible to provide epoxy compounds with a reduced melt viscosity in comparison with known epoxy amphiphiles and, consequently, such compounds are thought to have improved dispersing efficiency in comparison with conventional epoxy amphiphiles.

Preferably, the compounds of the present invention have an epoxy equivalent weight, measured according to ASTM D1652-11e1 (ASTM International, West Conshohocken, Pa., 2011), of from 400 to 200,000, more preferably from 450 to 20,000, even more preferably from 500 to 10,000, and even more preferably from 550 to 1,500.

The hydrophobic epoxy moiety, represented by "A" in Formulas (I) and (II) above, comprises an epoxy moiety linked to a cycloaliphatic and/or an aromatic hydrocarbylene moiety. Preferably, the cycloaliphatic or aromatic hydrocarbylene moiety is selected from a residue of a compound according to Formula (III) or Formula (IV):

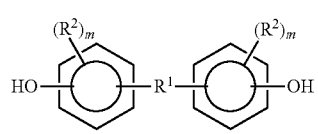

Formula (III)

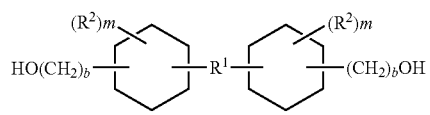

Formula (IV)

wherein $R^1$ represents $C_{1-10}$ alkylene, $C_{1-10}$ haloalkylene, $C_{4-10}$ cycloalkylene, carbonyl, sulfonyl, oxygen, sulphur or a direct bond; $R^2$ represents $C_{1-3}$ alkyl or halogen; each b independently represents 0 or 1; and each m independently represents 0 or an integer from 1 to 4.

Preferably, the hydrophobic epoxy moiety represented by "A" in Formulas (I) and (II) is a monovalent or divalent radical of a compound according to Formula (V) or Formula (VI):

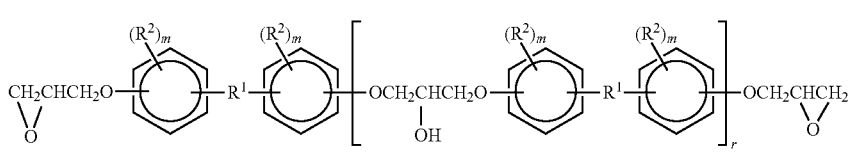

Formula (V)

Formula (VI)

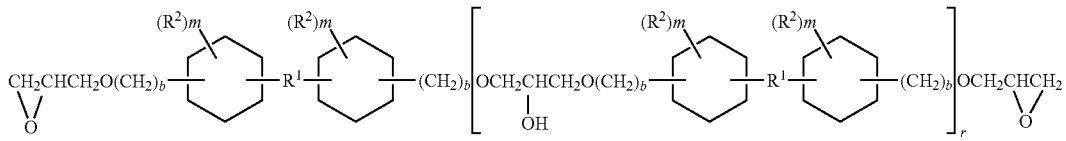

wherein $R^1$ represents $C_{1-10}$ alkylene, $C_{1-10}$ haloalkylene, $C_{4-10}$ cycloalkylene, carbonyl, sulfonyl, oxygen, sulphur or a direct bond; $R^2$ represents $C_{1-3}$ alkyl or halogen; each b independently represents 0 or 1; each m independently represents 0 or an integer from 1 to 4; and r represents 0 or an integer from 1 to 40, preferably 0 or an integer from 1 to 2.

More preferably, "A" represents a monovalent or divalent radical of a compound according to Formula (V). Even more preferably, "A" represents a monovalent or divalent radical of a bisphenol diglycidyl ether or an oligomer containing from 2 to 5 repeating units derived from a bisphenol diglycidyl ether. Still more preferably, "A" represents a monovalent radical according to Formula (VII) or a divalent radical formed by opening the terminal epoxy therein:

Formula (VII)

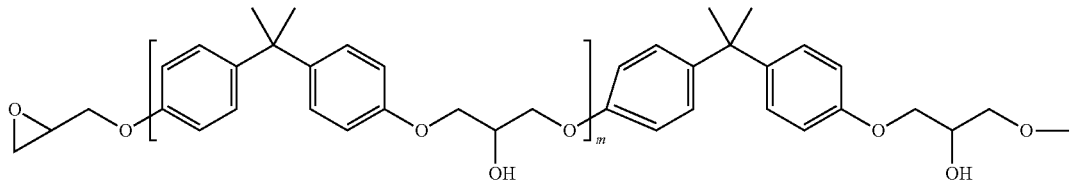

wherein m equals 0 or an integer from 1 to 2.

The hydrophilic moieties represented by "X" in Formulas (I) and (II) above, comprise a mono or divalent radical of a polyester or a mono or divalent radical of a polycarboxylic acid, each of which are formed via esterification of one or more polycarboxylic acids, anhydrides or mixtures thereof with one or more polyols, polyalkanolamines, or mixtures thereof. Preferably, said mono or divalent radical of a polyester is formed via esterification of one or more dicarboxylic acids, anhydrides or mixtures thereof with one or more polyols, polyalkanolamines or mixtures thereof. Preferably, said polycarboxylic acid is formed via esterification of one or more tetracarboxylic acids, dianhydrides or mixtures thereof with one or more polyols, polyalkanolamines or mixtures thereof.

Preferably, X represents a mono or divalent radical of a polyester. Preferably, such polyesters are formed via esterification of an aromatic or cycloaliphatic dianhydride with one or more polyols, polyalkanolamines, or mixtures thereof.

Preferably, X represents a mono or divalent radical of a polycarboxylic acid. Preferably, such polycarboxylic acids are formed via esterification of an aromatic or cycloaliphatic dianhydride with one or more polyols, polyalkanolamines, or mixtures thereof.

Preferably, the polyoxyalkylene is selected from polyethylene glycol, polypropylene glycol and mixtures thereof, and/or said polyoxyalkylene alkyl ether is selected from a polyethylene glycol $C_{1-4}$ alkyl ether, polypropylene glycol $C_{1-4}$ alkyl ether, and mixtures thereof.

Preferably, the polyester or polycarboxylic acid is a monomer or an oligomer comprising a total of 2 to 20 monomer units.

Preferably, said monomers are selected from divalent radicals of polyesters according to Formula (VIII) or Formula (IX), divalent radicals of polycarboxylic acids according to Formula (X) and mixtures thereof or a monovalent acid or salt thereof:

Formula (VIII)

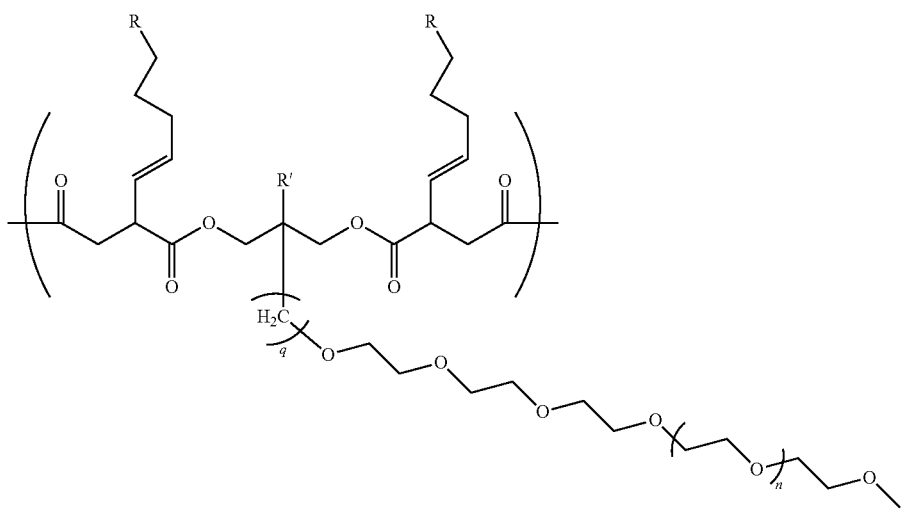

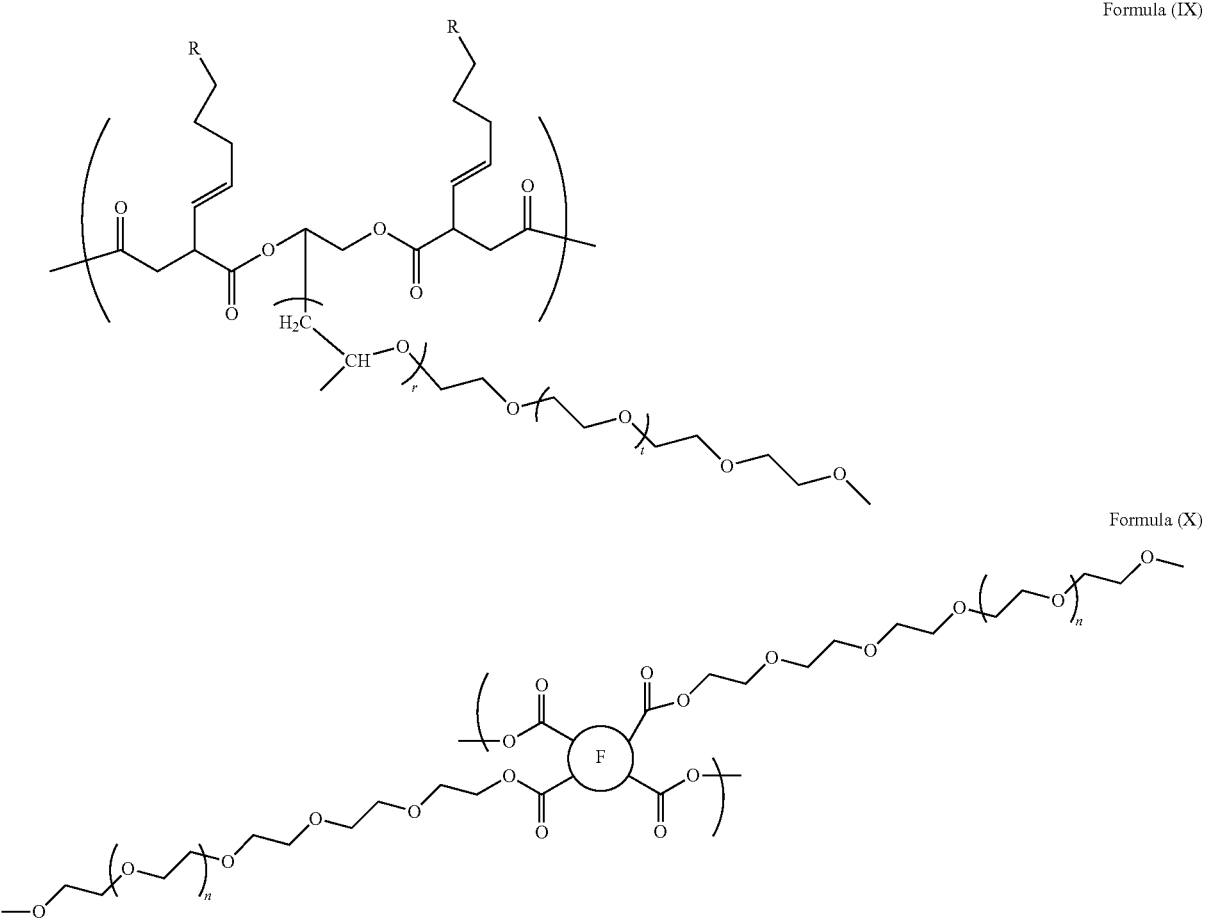

Formula (IX)

Formula (X)

wherein R represents a $C_{5-12}$ alkyl group; R' represents H or a $C_{1-5}$ alkyl group, preferably H; q represents 0 or 1; r represents 0 or an integer from 1 to 10; t represents an integer from 15 to 200; n represents an integer from 5 to 200; and Ⓕ represents a $C_{1-20}$ aromatic or aliphatic hydrocarbylene moiety.

Particularly preferred compounds of the present invention are either formed from a polyester and may be represented by Formula (XI) or Formula (XII), or are formed from a polycarboxylic acid and may be represented by Formula (XIII):

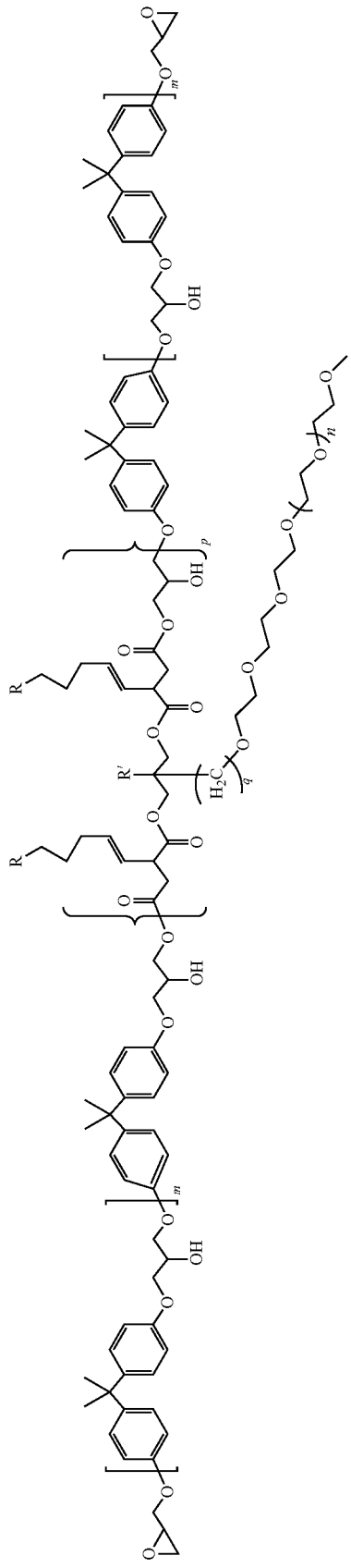
Formula (XI)
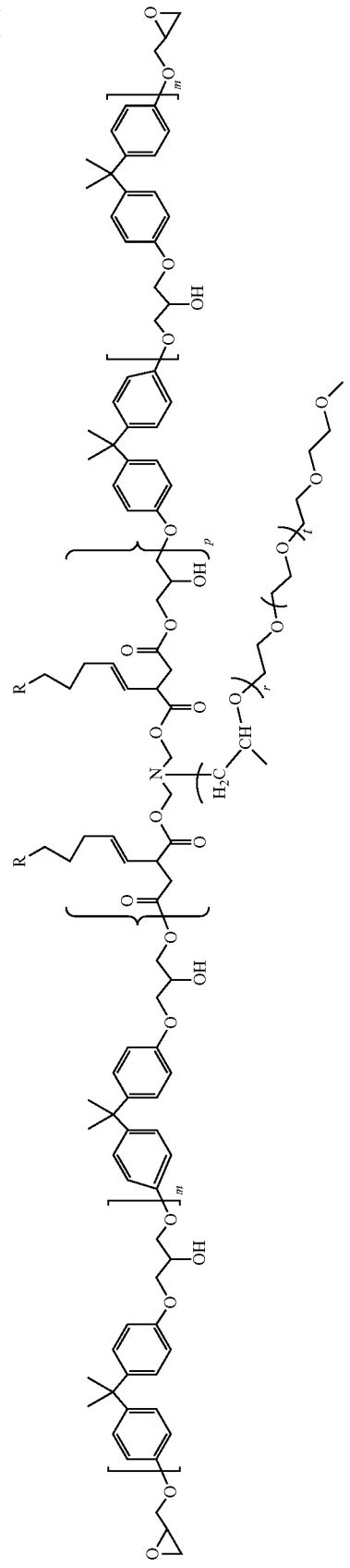
Formula (XII)

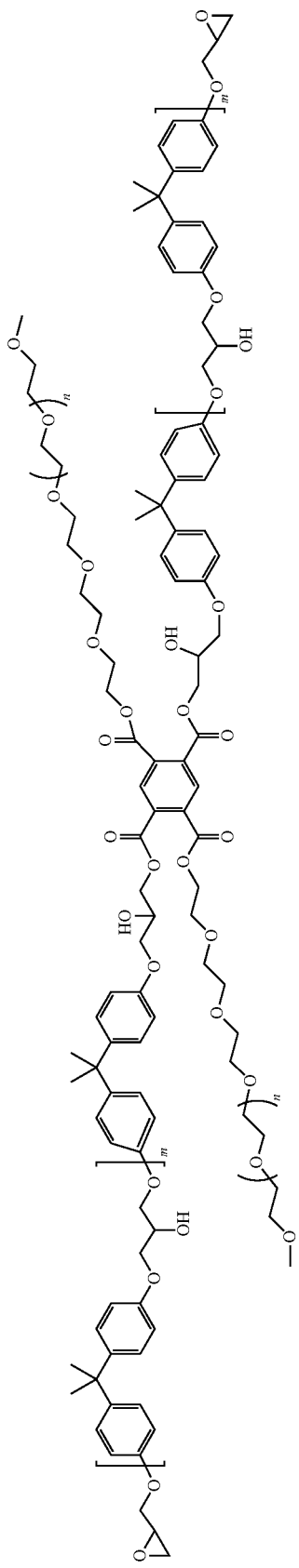
Formula (XIII)

wherein:
each R independently represents a $C_{5-12}$ alkyl group; R' represents H or a $C_{1-5}$ alkyl group, preferably H; each m independently represents 0, or an integer from 1 to 40, preferably 0, 1 or 2; p represents an integer from 1 to 20; q represents 0 or 1; r represents 0 or an integer from 1 to 10, preferably 0 or an integer from 1 to 5; t represents an integer from 15 to 200, preferably from 20 to 75, more preferably from 25 to 30; and each n represents an integer from 5 to 250, preferably from 7 to 85, more preferably from 10 to 40

Preferably, the compounds of the present invention have a weight average molecular weight, determined by gel permeation chromatography (GPC), from 2000 to 25000, preferably, from 4000 to 20000, and more preferably from 5000 to 15000.

The compounds of the present invention can be dispersed in water, thereby providing aqueous compositions of the present invention.

Preferably, the compounds of the present invention are the sole epoxy resin components present in the aqueous compositions, i.e. self-dispersing compositions Preferably, the compounds of the present invention are used in aqueous compositions to disperse additional epoxy resin(s) which are not, in themselves, water dispersible.

Preferably, the compounds of the present invention may be used in combination with anionic surfactants as such sulfonate surfactants, phosphate surfactants, carboxylate surfactants or their mixtures to disperse additional epoxy resins. More preferably, the second additional surfactants are sodium alkyl sulfosuccinates, i.e., sodium dioctyl sulfosuccinate. The weight ratio of the compounds of the present invention to the total anionic surfactants may be 100:1 to 1:100 in the surfactant combination.

The aqueous dispersions may be prepared by contacting the compound of the present invention with water to provide a self-dispersible epoxy resin dispersion or, alternatively, by contacting a compound of the present invention with a second epoxy resin which is not water dispersible and water to provide a dispersion of said second epoxy resin. In preferred embodiments, the water is at ambient temperature, i.e. about 10 to 30° C., preferably about 20 to 25° C.

The resultant dispersions contain sufficient epoxy resin(s) to allow the resin to form a continuous coating once the dispersion has been applied onto the surface of a substrate and the water has evaporated away. Preferably, the dispersions contain from 20 to 80 weight percent, based on the total weight (including water) of the composition, of epoxy resin(s), more preferably from 40 to 70 weight percent and most preferably from 50 to 60 weight percent.

Aqueous dispersions of the compounds of the present invention can be used as curable coating compositions for a substrate. Such dispersions may be combined with an epoxy resin curing agent prior to application to the surface to be coated or, alternatively, the curing agent may be applied to the composition after the composition has been applied to the surface of the substrate to be coated. Suitable curing agents include any compound known in the art for curing epoxy resins. Preferred curing agents are selected from water soluble polyamines, polyamides, polyamidoamines and mixtures thereof.

Preferably, sufficient curing agent is combined with the coating compositions of the present invention to cure the epoxy resin(s). In this regard, the ratio of glycidyl ether equivalents to equivalents of moieties which react with the glycidyl ether moieties is preferably from 0.6:1.4 to 1.4:0.6, more preferably from 0.8:1.1 to 1.1:0.98.

The waterborne dispersions of the present invention may include conventional additives, such as pigments, dyes, stabilizers and plasticizers.

Some embodiments of the present invention shall now be described by way of exemplification only. All ratios, parts and percentages are expressed in terms of dry weight unless otherwise specified and all components are of good commercial quality unless otherwise specified, Abbreviations used in the Examples and Tables are listed below alongside their corresponding descriptions:

A1 Catalyst: ethyltryphenylphosphonium acetate in methanol (70% solid) commercially available from the Dow Chemical Company (Midland, Mich.)

DER 330: liquid epoxy resin formed as a reaction product of epichlorohydrin and bisphenol A having an epoxide equivalent weight, measured according to ASTM D-1652-11e1 (ASTM International, West Conshohocken, Pa., 2011), from 176 to 185 commercially available from the Dow Chemical Company as D.E.R.™ 330.

DER 331: liquid epoxy resin formed as a reaction product of epichlorohydrin and bisphenol A having an epoxide equivalent weight, measured according to ASTM D-1652-11e1 (ASTM International, West Conshohocken, Pa., 2011), from 182 to 192 commercially available from the Dow Chemical Company as D.E.R.™ 331.

EEW: Epoxy Equivalent Weight

MPEG350: polyethyleneglycol methylether having a weight average molecular weight of approximately 350 (Sigma Aldrich, St. Louis, Mo.)

$M_n$: Number average molecular weight, determined by gel permeation chromatography (GPC)

MPEG550: polyethyleneglycol methylether having a weight average molecular weight of approximately 550 (Sigma Aldrich)

MPEG750: polyethyleneglycol methylether having a weight average molecular weight of approximately 750 (Sigma Aldrich)

MPEG2000: polyethyleneglycol methylether having a weight average molecular weight of approximately 2000 (Sigma Aldrich)

MPEG5000: polyethyleneglycol methylether having a weight average molecular weight of approximately 2000 (Sigma Aldrich)

$M_w$: Weight average molecular weight, determined by gel permeation chromatography (GPC)

PEG1450: polyethyleneglycol having a weight average molecular weight of approximately 1450 (Sigma Aldrich)

PEG4600: polyethyleneglycol having a weight average molecular weight of approximately 4600 (Sigma Aldrich)

Diol A: ethylene oxide (EO)/propylene oxide (PO) substituted polyglycol diol according to the chemical formula: $CH_3-O-(EO)_{31}-(PO)_{10}-N(CH_2CH_2OH)_2$ Diol B: ethylene oxide (EO)/propylene oxide (PO) substituted polyglycol diol according to the chemical formula: $CH_3-O-(EO)_{19}-(PO)_3-N(CH_2CH_2OH)_2$ Tegomer: polyether-1,3-diol having a molecular weight of approximately 1200 and a an hydroxyl value (mg KOH/g) of approximately 90 commercially available from Evonik Industries AG (Darmstadt, Germany) as Tegomer™ D3403

YmerN120: a linear difunctional polyethylene glycol monomethyl ether having a molecular weight of approximately 1000 and an hydroxyl number (mg KOH/g) of 100 to 120 commercially available from Perstorp Chemical Company (Perstorp, Sweden) as Ymer™ N120

EXAMPLES

The following examples demonstrate a surprising reduction in observable foaming in aqueous dispersions comprising epoxy resin compounds of the present invention. Further, in preferred examples, the presence of one or more pendent polyoxyalkylene or polyoxyalkylene alkyl ether radicals is shown to result in a surprising reduction in the melting viscosity of the epoxy resins, which is believed to be indicative of a higher dispersing efficiency.

Measurement of Melting Viscosity of Epoxy Resins:

Throughout the following examples, the melting viscosity of epoxy resins was measured in a conventional manner using a TA Instruments AR-2000 parallel plate rheometer (New Castle, Del.). In this method, 2 to 4 g of the sample resin is placed on the lower, stationary plate which is heated and maintained at 80° C. for the duration of the test, thereby melting the sample resin. An upper, rotatable plate (50 mm 0°) is then positioned above the lower plate such that the interplate separation provides a 1,000 μm gap in which the sample to be tested is located. Following positioning of the upper plate, the plate is manually rotated such that the centrifugal force applied to the sample facilitates the creation of a homogenous layer of resin between the upper and lower plates before any excess resin protruding from the sides of the plates is removed. The automated test procedure is then initiated and the upper plate is rotated under computational control. Sample viscosity, measured in cP, is then computationally derived, using software included in the rheometer hardware, via conversion of the measured resistance to upper plate rotation into a viscosity value. Sample analysis is conducted over a 25 minute timescale, with a total of 250 viscosity data points being recorded. Upon completion of the test procedure, the recorded data points are averaged in order to arrive at a final melting viscosity value, in centipoise (cP), for each sample.

Measurement of Foaming, Stability and Viscosity of Epoxy Dispersions:

Dispersion viscosities, in centipoise (cP), were measured at room temperature, i.e. from about 20 to 25° C. using a Brookfield DV-I Prime Viscometer (Middleboro, Mass.). During sample viscosity determination, appropriately sized spindles were selected based upon the suitable viscosity measuring ranges of each spindle. Similarly, appropriate spindle rotation speeds were selected based upon the viscosity of the sample and the utilized spindle.

Stability analysis was conducted immediately following the formation of the epoxy resin-containing dispersions. In order to carry out such tests, 15 ml of the dispersions, which comprise approximately fifty weight percent epoxy resin (based on the total weight of the composition, including water), were placed into 20 ml clear glass vials which were located on a stable horizontal surface. At various time intervals, the degree of separation of water and resin was visually observed, with the depth of the uppermost phase comprising clear liquid which appeared to be free of resin, which results from settling out of the resin, being measured with a ruler and recorded as an indication of stability. The size of phase separation together with the time taken to achieve such separation indicates dispersion stability, with a small separation measured over a long timescale being indicative of highly stable dispersions. As the dispersions contained approximately 50 percent solids, it is apparent that if one half of the height of the composition appears to be free of resin, the resin should be considered to have completely separated from the water.

The degree of foaming observed on the surface of such dispersions was recorded concurrently with stability analysis. The degree of foaming was visually observed upon placing 15 ml samples of each dispersion within 25 ml clear glass vials located on a stable horizontal surface, with each dispersion being allocated a Foam Rating ranging from 1 to 5. The final rating score took into consideration both the degree of foaming and the time taken for said foam to dissipate. As a guide, the following Foam Ratings relate to the following: 1—no foaming was observed; 2—a small amount of foam was initially observed but quickly dissipated; 3—significant foaming was initially observed but quickly dissipated; 4—significant foaming was initially observed and did not dissipate within 1 hour; 5—complete foaming of the dispersion was observed and did not dissipate within 1 hour.

Measurement of Acid Number:

Throughout the following examples, the acid number of the synthesised resins and precursors thereof were measured via a conventional titration method. In this method, a pre-weighed sample is dissolved in 50 ml acetone and combined with 5 drops of phenolphthalein indicator solution. The resultant solution is then subjected to titration with 0.1N aqueous sodium hydroxide solution, wherein the stoichiometric point for the sample is recorded as the volume of titrant required for the indicator to undertake a pink colouration. A control titration is carried out in an analogous fashion, wherein the stoichiometric point for a solution of acetone and phenolphthalein is recorded. For accuracy, samples are analysed at least in duplicate, with the mean average stoichiometric point being used to calculate the acid number according to the following formula:

$$\text{acid number(wt \%)} = \frac{45.02N \times (V2 - V1)}{10\ w}$$

wherein N represents the Normality of titrant, i.e. sodium hydroxide, solution; V2 represents the volume of titrant required to reach the stoichiometric point during the sample test; V1 represents the volume of titrant required to reach the stoichiometric point during the control test; and w represents the weight of the tested sample.

Example 1

Polyester formation via esterification of 2-dodecene-1-ylsuccinic anhydride with Tegomer was conducted in a 250 ml 4-neck round bottom flask equipped with a nitrogen inlet, mechanical stirrer, condenser and a temperature regulator. 99.2 g of Tegomer was charged to the flask, maintained under nitrogen and heated to a temperature of 130° C. prior to addition of 42.4 g 2-dodecene-1-ylsuccinic anhydride through a 50 ml syringe over a 5 minute timescale, during which the mixture was subjected to continual stirring. The resultant mixture was then heated to 140° C. and maintained at this temperature for 450 minutes, by which time the acid number was stabilized at 5.80%.

Epoxy resin synthesis was then conducted following polyester formation, by the addition of 58.4 g DER 330 to the flask, which caused a temperature reduction to 138° C., followed by addition of 0.08 g A1 catalyst to the resultant mixture. The mixture was then heated to 140° C. and kept at this temperature for 160 minutes, by which time the acid number had reduced to 0.02%. As a final step, 0.056 g methyl p-toluene sulfonate (MPTS) was added into the mixture under stirring. The absolute yield of epoxy resin was 180 g, which corresponded to a fractional yield of 100%. The EEW, measured via titration according to ASTM D1652-11e1 (2011), was 1319, and the epoxy percentage, calculated using the formula $$\frac{43}{EEW} \times 100,$$

was 3.26.

Example 2

Polyester formation via esterification of 2-dodecene-1-ylsuccinic anhydride with YmerN120 was conducted substantially in accordance with the method of Example 1 in identical apparatus to that used in Example 1. 100.04 g YmerN120 was charged to the flask, maintained under nitrogen and heated to a temperature of 108° C. prior to addition of 47.74 g 2-dodecene-1-ylsuccinic anhydride through a 50 ml syringe over a 5 minute timescale, during which the mixture was subjected to continual stiffing. The resultant mixture was then heated to 142° C. and maintained at this temperature for 450 minutes, by which time FTIR spectral analysis of the resultant polyester confirmed that no peak was observable at 1864 cm$^{-1}$, which corresponds to an anhydride specific absorption peak.

Epoxy resin synthesis was then conducted following polyester formation, by the addition of 65.71 g DER 330 to the flask, which caused a temperature reduction to 120° C., followed by addition of 0.085 g A1 catalyst to the resultant mixture. The mixture was then heated to 144° C. and kept at this temperature for 120 minutes, by which time the acid number had reduced to 0.01%. As a final step, 0.056 g MPTS was added into the mixture under stirring. The absolute yield of epoxy resin was 190 g, which corresponded to a fractional yield of 100%. The EEW was 1150, and the epoxy percentage was 3.74.

Example 3

Polyester formation via esterification of 2-dodecene-1-ylsuccinic anhydride with Diol A was conducted substantially in accordance with the method of Example 1 in identical apparatus to that used in Example 1. 114.78 g Diol A was charged to the flask, maintained under nitrogen and heated to a temperature of 110° C. prior to addition of 27.92 g 2-dodecene-1-ylsuccinic anhydride through a 50 ml syringe over a 5 minute timescale, during which the mixture was subjected to continual stirring. The resultant mixture was maintained at 110° C. for 180 minutes, by which time FTIR spectral analysis of the resultant polyester confirmed that no peak was observable at 1864 cm$^{-1}$.

Epoxy resin synthesis was then conducted following polyester formation, by the addition of 57.30 g DER 330 to the flask which caused a temperature increase to 120° C., followed by the addition of 0.08 g A1 catalyst to the resultant mixture. The mixture was then heated to 149° C. and kept at this temperature for 240 minutes, by which time the acid number had reduced to 0.01%. As a final step, 0.056 g MPTS was added into the mixture under stirring. The absolute yield of epoxy resin was 190 g, which corresponded to a fractional yield of 100%. The EEW was 821, and the epoxy percentage was 5.24.

Example 4

Polyester formation via esterification of 2-dodecene-1-ylsuccinic anhydride with Diol B was conducted substantially in accordance with the method of Example 1 in identical apparatus to that used in Example 1. 94.05 g Diol B was charged to the flask, maintained under nitrogen and heated to a temperature of 110° C. prior to addition of 44.58 g 2-dodecene-1-ylsuccinic anhydride through a 50 ml syringe over a 5 minute timescale, during which the mixture was subjected to continual stirring. The resultant mixture was maintained at 110° C. for 120 minutes, by which time FTIR spectral analysis of the resultant polyester confirmed that no peak was observable at 1864 cm$^{-1}$.

Epoxy resin synthesis was then conducted following polyester formation, by the addition of 61.36 g DER 330 to the flask which caused a temperature increase to 120° C., followed by the addition of 0.08 g A1 catalyst to the resultant mixture. The mixture was then heated to 145° C. and kept at this temperature for 330 minutes, by which time the acid number had reduced to 0.01%. As a final step, 0.056 g MPTS was added into the mixture under stirring. The absolute yield of epoxy resin was 190 g, which corresponded to a fractional yield of 100%. The EEW was 815, and the epoxy percentage was 5.27.

Example 5

Polycarboxylic acid formation via esterification of pyromellitic dianhydride with MPEG 550 was conducted substantially in identical apparatus to that used in Example 1. The flask was charged with 100.0 g MPEG 550 which was subsequently dried for a period of 120 minutes under nitrogen bubbling at 120° C. prior to addition of 19.47 g of pyromellitic dianhydride. The resultant mixture was then heated to 148° C. and maintained at this temperature for 360 minutes, by which time FTIR spectral analysis of the resultant polyester confirmed that no peak was observable at 1851 cm$^{-1}$, which corresponds to an anhydride specific absorption peak.

Epoxy resin synthesis was then conducted following polycarboxylic acid formation, by the addition of 93.97 g of DER 330 to the flask, which caused a temperature reduction to 130° C., followed by the addition of 0.11 g of A1 catalyst to the resultant mixture. The mixture was then heated to 148° C. and kept at this temperature for 90 minutes, by which time the acid number had reduced to less than 0.01%. The absolute yield of epoxy resin was 200 g, which corresponded to a fractional yield of 100%. The EEW was 636, and the epoxy percentage was 6.76.

Example 6

Polycarboxylic acid formation via esterification of pyromellitic dianhydride with MPEG 750 was conducted substantially in accordance with the method of Example 5 in identical apparatus to that used in Example 5. The flask was charged with 100.0 g MPEG 750 which was subsequently dried for a period of 120 minutes under nitrogen bubbling at 120° C. prior to addition of 14.99 g of pyromellitic dianhydride. The resultant mixture was then heated to 151° C. and maintained at this temperature for 310 minutes, by which time FTIR spectral analysis of the resultant polyester confirmed that no peak was observable at 1851 cm$^{-1}$.

Epoxy resin synthesis was then conducted following polycarboxylic acid formation, by the addition of 60.24 g of DER 330 to the flask, which caused a temperature reduction to 129° C., followed by the addition of 0.087 g of A1 catalyst to the resultant mixture. The mixture was then heated to 151° C. and kept at this temperature for 80 minutes, by which time the acid number had reduced to less than 0.01%. The absolute yield of epoxy resin was 165 g, which corresponded to a fractional yield of 100%. The EEW was 872, and the epoxy percentage was 4.93.

Example 7

Polycarboxylic acid formation via esterification of pyromellitic dianhydride with MPEG 2000 was conducted substantially in accordance with the method of Example 5 in identical apparatus to that used in Example 5. The flask was charged with 100.0 g MPEG 2000 which was subsequently dried for a period of 120 minutes under nitrogen bubbling at 120° C. prior to addition of 5.04 g of pyromellitic dianhydride. The resultant mixture was then heated to 144° C. and maintained at this temperature for 100 minutes, by which time FTIR spectral analysis of the resultant polyester confirmed that no peak was observable at 1851 cm$^{-1}$.

Epoxy resin synthesis was then conducted following polycarboxylic acid formation, by the addition of 59.91 g of DER 330 to the flask, which caused a temperature reduction to 120° C., followed by the addition of 0.082 g of A1 catalyst to the resultant mixture. The mixture was then heated to 146° C. and kept at this temperature for 50 minutes, by which time the acid number had reduced to less than 0.01%. The absolute yield of epoxy resin was 150 g, which corresponded to a fractional yield of 100%. The EEW was 586, and the epoxy percentage was 7.33.

Example 8

Polycarboxylic acid formation via esterification of pyromellitic dianhydride with MPEG 5000 was conducted substantially in accordance with the method of Example 5 in identical apparatus to that used in Example 5. The flask was charged with 100.0 g MPEG 5000 which was subsequently dried for a period of 120 minutes under nitrogen bubbling at 120° C. prior to addition of 2.3 g of pyromellitic dianhydride. The resultant mixture was then heated to 151° C. and maintained at this temperature for 380 minutes, by which time FTIR spectral analysis of the resultant polyester confirmed that no peak was observable at 1851 cm$^{-1}$.

Epoxy resin synthesis was then conducted following polycarboxylic acid formation, by the addition of 33.17 g of DER 330 to the flask, which caused a temperature reduction to 120° C., followed by the addition of 0.082 g of A1 catalyst to the resultant mixture. The mixture was then heated to 146° C. and kept at this temperature for 70 minutes, by which time the acid number had reduced to less than 0.01%. The absolute yield of epoxy resin was 120 g, which corresponded to a fractional yield of 100%. The EEW was 810, and the epoxy percentage was 5.31.

Comparative Example 1

Polyester formation via esterification of 2-dodecene-1-ylsuccinic anhydride with PEG 1450 was conducted in a 1000 ml glass reactor equipped with an oil heated jacket, and a 4-neck containing flange equipped with a nitrogen inlet, mechanical stirrer, condenser and a temperature regulator. 320.31 g of PEG 1450 was charged to the flask, maintained under nitrogen and heated to a temperature of 130° C. prior to addition of 117.7 g 2-dodecene-1-ylsuccinic anhydride through a 100 ml syringe over a 30 minute timescale, during which the mixture was subjected to continual stirring. The resultant mixture was then heated to 140° C. and maintained at this temperature for 250 minutes, by which time the acid number was stabilized at 4.85%.

Epoxy resin synthesis was then conducted following polyester formation, by the addition of 161.9 g of DER 330 to the flask which caused a temperature reduction to 117° C., followed by addition of 0.24 g of A1 catalyst to the resultant mixture. The mixture was then heated to 140° C. and kept at this temperature for 180 minutes, by which time the acid number had reduced to 0.02%. As a final step, 0.168 g of MPTS was added into the mixture under stirring. The absolute yield of epoxy resin was 560 g, which corresponded to a fractional yield of 100%. The EEW was 1350, and the epoxy percentage was 3.19.

Comparative Example 2

Polyester formation via esterification of 2-dodecene-1-ylsuccinic anhydride with PEG 4600 was conducted substantially in accordance with the method of Comparative Example 1 in identical apparatus to that used in Comparative Example 1. 390.52 g of PEG 4600 was charged to the flask, maintained under nitrogen and heated to a temperature of 130° C. prior to addition of 45.46 g of 2-dodecene-1-ylsuccinic anhydride through a 100 ml syringe over a 30 minute timescale, during which the mixture was subjected to continual stirring. The resultant mixture was then heated to 140° C. and maintained at this temperature for 200 minutes, by which time the acid number was stabilized at 2.01%.

Epoxy resin synthesis was then conducted following polyester formation, by the addition of 162.01 g of DER 330 to the flask, which caused a temperature reduction to 117° C., followed by the addition of 0.24 g of A1 catalyst to the resultant mixture. The mixture was then heated to 140° C. and kept at this temperature for 120 minutes, by which time the acid number had reduced to 0.02%. As a final step, 0.168 g of MPTS was added into the mixture under stiffing. The absolute yield of epoxy resin was 560 g, which corresponded to a fractional yield of 100%. The EEW was 837, and the epoxy percentage was 5.14.

Comparative Example 3

Polycarboxylic acid formation via esterification of pyromellitic dianhydride with MPEG 350 was conducted substantially in accordance with the method of Example 5 in identical apparatus to that used in Example 5. The flask was charged with 70.0 g MPEG 350 which was subsequently dried for a period of 120 minutes under nitrogen bubbling at 120° C. prior to addition of 22.49 g of pyromellitic dianhydride. The resultant mixture was then heated to 150° C. and maintained at this temperature for 210 minutes, by which time FTIR spectral analysis of the resultant polyester confirmed that no peak was observable at 1851 cm$^{-1}$.

Epoxy resin synthesis was then conducted following polycarboxylic acid formation, by the addition of 108.79 g of DER 330 to the flask, which caused a temperature reduction to 130° C., followed by the addition of 0.10 g of A1 catalyst to the resultant mixture. The mixture was then heated to 146° C. and kept at this temperature for 100 minutes, by which time the acid number had reduced to less than 0.01%. The absolute yield of epoxy resin was 190 g, which corresponded to a fractional yield of 100%. The EEW was 533, and the epoxy percentage was 8.07.

Following synthesis, the melt viscosity of each of the above epoxy resins was experimentally determined in accordance with the procedure detailed above, with the results summarised in Table 1 below. The data clearly indicates that epoxy resins according to the present invention have a reduced melt viscosity in comparison with epoxy resins which do not possess one or more pendent polyoxyalkylene or polyoxyalkylene alkyl ether radicals, i.e. Comparative Examples 1 and 2, and in comparison with epoxy resins which possess one or more pendent polyoxyalkylene or polyoxyalkylene alkyl ether radicals having a molecular weight below 400, i.e. Comparative Example 3.

TABLE 1

|  | Final EEW | Final % Epoxy | $M_w$ | $M_n$ | Melt Viscosity/cP |
| --- | --- | --- | --- | --- | --- |
| Example 1 | 1319 | 3.26 | 7,556 | 4855 | 526 |
| Example 2 | 1150 | 3.74 | 16766 | 3420 | 1180 |
| Example 3 | 821 | 5.24 | 15829 | 3919 | 347 |
| Example 4 | 815 | 5.27 | 12,320 | 3179 | 470 |
| Example 5 | 636 | 6.76 | 8174 | 2462 | 632 |

TABLE 1-continued

| | Final EEW | Final % Epoxy | $M_w$ | $M_n$ | Melt Viscosity/ cP |
|---|---|---|---|---|---|
| Example 6 | 872 | 4.93 | 9385 | 3166 | 819 |
| Example 7 | 586 | 7.33 | 4805 | 2223 | 260 |
| Example 8 | 810 | 5.31 | 11754 | 7641 | 1516 |
| Comparative Example 1 | 1350 | 3.19 | 6,395 | 1,840 | 1227 |
| Comparative Example 2 | 837 | 5.14 | 6,980 | 987 | 3085 |
| Comparative Example 3 | 533 | 8.07 | 18323 | 2101 | 1875 |

In order to demonstrate the antifoaming effect of the resins according to the present invention, each of the synthesized resins were incorporated into aqueous compositions comprising DER 331, and an epoxy resin which, in itself, does not form a stable dispersion in water. For each resin, an aqueous composition was prepared containing 5 weight percent of said resin and 45 weight percent DER 331, wherein said weight percentages are based on total weight (including water) of the aqueous composition. Once combined, the aqueous compositions were thoroughly mixed using a high speed centrifugal mixer system (Speed-Mixer™—DAC 150, 1FVZ-K) which was spun the compositions at 3500 rpm for 10 minutes, thereby forming an aqueous dispersion.

The particle size of each dispersion was experimentally measured immediately following completion of the mixing process by laser diffraction using a commercially available laser diffraction particle size analyzer, specifically the LS™ 13 320 MW particle size analyzer manufactured and supplied by Beckman Coulter, Inc. (Brea, Calif.). The Foam Rating, viscosity and stability of each dispersion was measured according to the procedures detailed above. A dispersion is considered to have acceptable stability if the experimentally derived value is less than 15 mm/45 min, preferably less than 15 mm/60 min. Further, a dispersion is considered to have acceptable viscosity if the experimentally derived value is less than 200 cp, preferably less than 100 cp. The results of these tests are summarized in Table 2 below:

TABLE 2

| | Particle Size/ μm | Foam Rating | Viscosity/ cP | Stability |
|---|---|---|---|---|
| Example 1 | 31 | 2 | 43 | 9 mm/60 min |
| Example 2 | 35 | 2 | 55 | 2 mm/45 min |
| Example 3 | 41 | 2 | 52 | 12 mm/45 min |
| Example 4 | 57 | 2 | 36 | 8 mm/45 mm |
| Example 5 | 51 | 2 | 78 | 7 mm/45 min |
| Example 6 | 42 | 2 | 30 | 4 mm/45 min |
| Example 7 | 73 | 2 | 36 | 8 mm/45 min |
| Example 8 | 23 | 2 | 78 | 2 mm/45 min |
| Comparative Example 1 | 31 | 4 | 40 | 5 mm/45 min |
| Comparative Example 2 | 23 | 4 | 250 | 0 mm/45 min |
| Comparative Example 3 | did not disperse | — | — | — |

The above data clearly indicates that epoxy resins of the present invention may be used as dispersing aids in aqueous compositions comprising epoxy resins with acceptable stability and viscosity. Further, it is apparent that aqueous dispersions comprising epoxy resins of the present invention have a reduced tendency to foam in comparison with dispersions comprising epoxy resins which do not possess one or more pendent polyoxyalkylene or polyoxyalkylene alkyl ether radicals, i.e. Comparative Examples 1 and 2. Further, the above data indicates that resins comprising one or more pendent polyoxyalkylene or polyoxyalkylene alkyl ether radicals having a molecular weight below 400, i.e. Comparative Example 3, were not suitable for use as a dispersing aid for such aqueous compositions.

To further evaluate the effect that compounds of the present invention have upon aqueous dispersions comprising epoxy resins, particle size, Foam Rating, viscosity and stability were experimentally derived as discussed above following the formation of aqueous dispersions by homogenization. For each tested resin, an aqueous composition was prepared containing 5 weight percent of said resin and 45 weight percent DER 331, wherein said weight percentages are based on total weight (including water) of the aqueous composition. Once combined, the aqueous compositions were subjected to homogenization for a period of 5 minutes using a digital homogenizer (ULTRA-TURRAX® T25 Digital high-performance disperser by IKA®) for a period of 5 minutes, thereby forming an aqueous dispersion. The results of these tests are summarized in Table 3 below:

TABLE 3

| | Particle Size/ μm | Foam Rating | Viscosity/ cP | Stability |
|---|---|---|---|---|
| Example 2 | 18 | 2 | 98 | no separation observed |
| Example 6 | 19 | 2 | 85 | no separation observed |
| Example 7 | 24 | 2 | 83 | no separation observed |
| Example 8 | 24 | 2 | 87 | no separation observed |
| Comparative Example 2 | 23 | 4 | 210 | no separation observed |

The above data, in agreement with that provided in Table 2, clearly indicates that epoxy resins of the present invention may be used as dispersing aids in aqueous compositions comprising epoxy resins with acceptable stability and viscosity. Furthermore, it is apparent that aqueous dispersions comprising epoxy resins of the present invention have a reduced tendency to foam in comparison with dispersions comprising epoxy resins which do not possess one or more pendent polyoxyalkylene or polyoxyalkylene alkyl ether radicals, i.e. Comparative Example 2.

The invention claimed is:
1. A compound comprising the epoxide functional reaction product of:
(a) at least one molecule comprising two terminal epoxy-reactive moieties; with
(b) two molecules comprising two epoxide moieties;
wherein said compound comprises, pendent to the residue of (a), one or more polyoxyalkylene alkyl ether radical(s) having a weight average molecular weight of at least 400;
wherein said compound is represented by Formula (I) or (II):

A-(X-A-)$_y$-X-A                 Formula (I)

X-(A-X-)$_z$-A                 Formula (II)

wherein:
each A independently represents:

(i) an epoxy terminated monovalent radical formed from one or more diglycidyl ether compounds comprising a cycloaliphatic and/or an aromatic hydrocarbylene moiety; or (ii) a divalent radical formed by opening of the terminal epoxy of (i);

each X independently represents:

a divalent radical of a polyester represented by Formula (VIII) or Formula (IX):

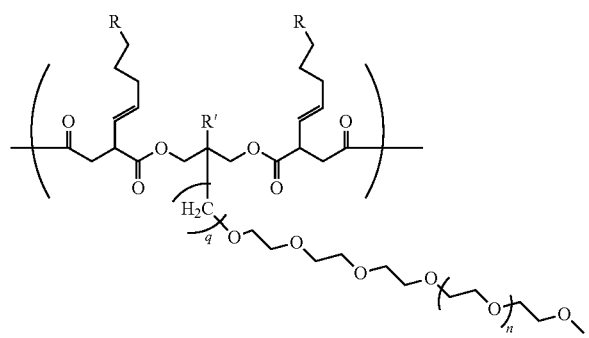

Formula (VIII)

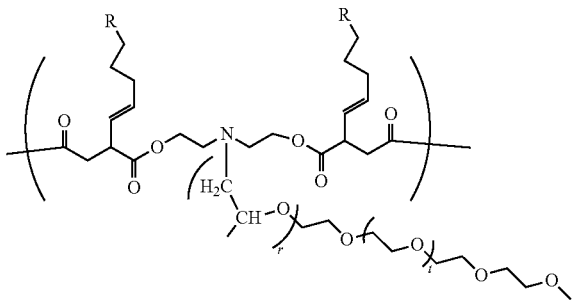

Formula (IX)

wherein R represents a $C_{5-12}$ alkyl group; R' represents H or a $C_{1-5}$ alkyl group; q represents 0 or 1; r represents 0 or an integer from 1 to 10; t represents an integer from 15 to 200; and n represents an integer from 5 to 200;

y represents an integer from 0 to 10; and z represents an integer from 1 to 10.

2. The compound according to claim 1, wherein said compound has an epoxy equivalent weight from 400 to 200,000.

3. The compound according to claim 1, wherein A represents a monovalent or divalent radical derived from a compound according to Formula (V) or Formula (VI):

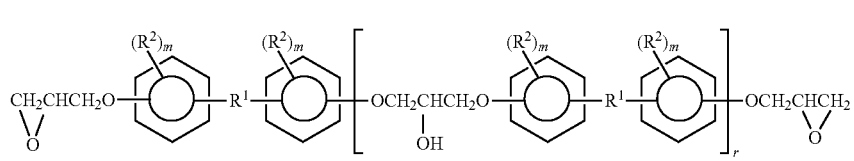

Formula (V)

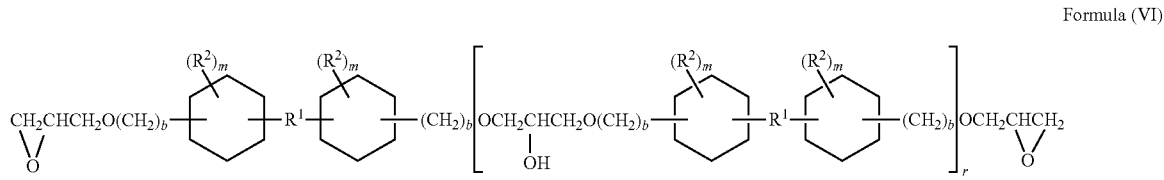

Formula (VI)

wherein $R^1$ represents $C_{1-10}$ alkylene, $C_{1-10}$ haloalkylene, $C_{4-10}$ cycloalkylene, carbonyl, sulfonyl, oxygen, sulphur or a direct bond; $R^2$ represents $C_{1-3}$ alkyl or halogen; each b independently represents 0 or 1; each m independently represents 0 or an integer from 1 to 4; and r represents 0 or an integer from 1 to 40.

4. The compound according to claim 1, wherein each X represents a monovalent or divalent radical of a polyester.

5. The compound according to claim 1, wherein said polyoxyalkylene alkyl ether is selected from a polyethylene glycol $C_{1-4}$ alkyl ether, polypropylene glycol $C_{1-4}$ alkyl ether, and mixtures thereof.

6. A compound according to claim 1, which is formed from a polyester and is represented by Formula (XI) or (XII):

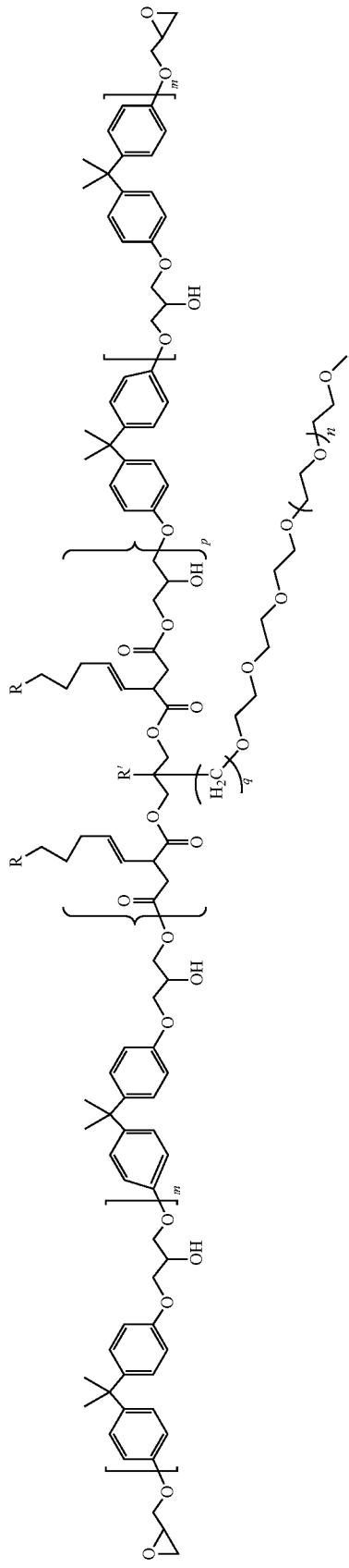
Formula (XI)
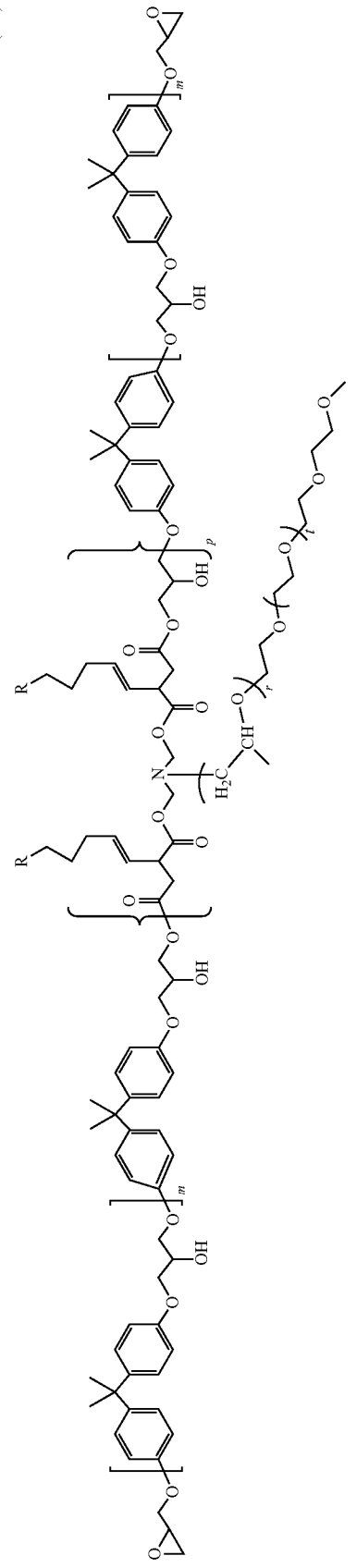
Formula (XII)

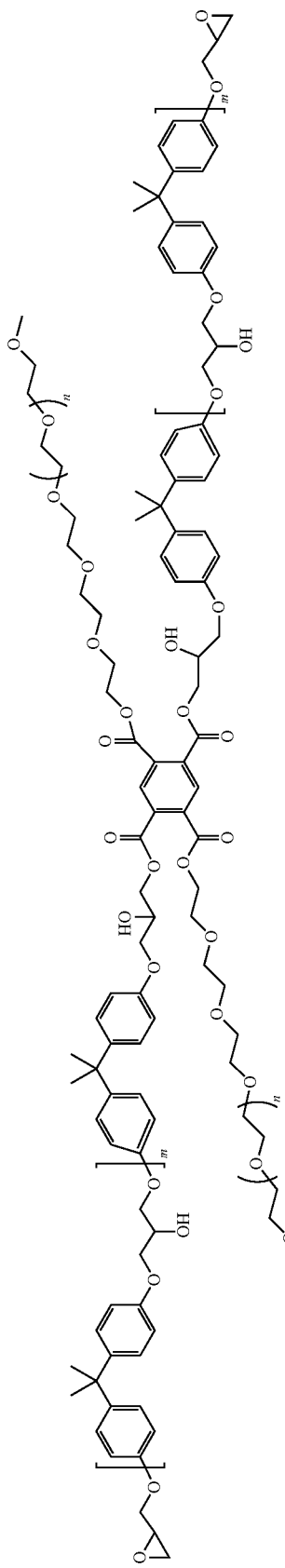
Formula (XIII)

wherein each R represents a $C_{5-12}$ alkyl group; R' represents H or a $C_{1-5}$ alkyl group; each m represents 0 or an integer from 1 to 40; p represents an integer from 1 to 20; q represents 0 or 1; r represents 0 or an integer from 1 to 10; t represents an integer from 15 to 200; and n represents an integer from 5 to 200.

7. A compound according to claim 1, wherein said compound has a weight average molecular weight from 2000 to 25000.

8. An aqueous coating composition comprising a compound according to claim 1.

9. The aqueous coating composition as claimed in claim 8, further comprising one or more anionic surfactants.

10. The compound according to claim 1, wherein the polyoxyalkylene alkyl ether radical(s) have a weight average molecular weight of 500 to 4000, as measured by gel permeation chromatography.

* * * * *